US006614021B1

(12) United States Patent
Kalinitchenko

(10) Patent No.: US 6,614,021 B1
(45) Date of Patent: Sep. 2, 2003

(54) ION OPTICAL SYSTEM FOR A MASS SPECTROMETER

(75) Inventor: Iouri Kalinitchenko, Victoria (AU)

(73) Assignee: Varian Australian PTY LTD, Mulgrave (AU)

( * ) Notice: Subject to any disclaimer, the term of this patent is extended or adjusted under 35 U.S.C. 154(b) by 0 days.

(21) Appl. No.: 09/787,773

(22) PCT Filed: Sep. 14, 1999

(86) PCT No.: PCT/AU99/00766

§ 371 (c)(1), (2), (4) Date: Mar. 21, 2001

(87) PCT Pub. No.: WO00/17909

PCT Pub. Date: Mar. 30, 2000

(30) Foreign Application Priority Data

Sep. 23, 1998 (AU) .............................................. PP 6105
Apr. 12, 1999 (AU) .............................................. PP 9672

(51) Int. Cl.[7] .......................... B01D 59/44; H01S 49/28
(52) U.S. Cl. ....................................................... 250/294
(58) Field of Search ................................ 250/288, 309, 250/294

(56) References Cited

U.S. PATENT DOCUMENTS 4,731,532 A 3/1988 Frey et al. .................. 250/287
4,754,135 A 6/1988 Jackson ...................... 250/287
4,945,236 A * 7/1990 Mogami et al. ............ 250/309
5,017,780 A 5/1991 Kutscher et al. ............ 250/287
5,034,605 A * 7/1991 Bayly ......................... 250/309
5,117,107 A 5/1992 Guilhaus et al. ............ 250/287
5,160,840 A 11/1992 Vestal ........................ 250/287
5,559,337 A 9/1996 Ito et al. ................. 250/423 R
5,763,875 A 6/1998 Kaesdorf et al. ........... 250/287
5,773,823 A * 6/1998 Ito et al. ...................... 250/288
5,804,821 A * 9/1998 Nakagawa .................. 250/288
5,814,813 A 9/1998 Cotter et al. ................ 250/287
6,423,965 B1 * 7/2002 Hashimoto et al. ......... 250/288

FOREIGN PATENT DOCUMENTS

GB 2 274 197 7/1994
WO WO 98/40907 9/1998

OTHER PUBLICATIONS

Patent abstracts of Japan entitled "Flight–Time–Type Mass Spectrometer", published Feb. 21, 1987.
Article by Kutscher, et al., entitled "A Transversally and Longitudinally Focusing Time–Of–Flight Mass Spectrometer" published in *International Journal of Mass Spectrometry and Ion Processes*, vol. 103, (1991) pp. 117–128.

* cited by examiner

*Primary Examiner*—John R. Lee
*Assistant Examiner*—Johnnie L Smith, II
(74) *Attorney, Agent, or Firm*—Edward H. Berkowitz; Bella Fishman

(57) ABSTRACT

A mass spectrometer having an ion reflecting instead of ion transmissive optics system. The spectrometer includes an ion source (16) for providing a beam of sample particles including ions along an axis (24). Its ion optics system (34–46) establishes a reflecting electrostatic field for reflecting ions along a path (30) from the particle beam and focussing them at an entrance aperture (26) of a mass analyser (25) and ion detector (27) for spectrometric analysis. The invention allows more efficient separation of ions from neutral particles, gives better signal to noise ratios and allows for a compact "optical" path and thus cheaper instrument to be manufacctured. The reflecting electrostatic field can also be used to filter higher energy ions from lower energy ions. An ion optical system as such is also disclosed.

15 Claims, 2 Drawing Sheets

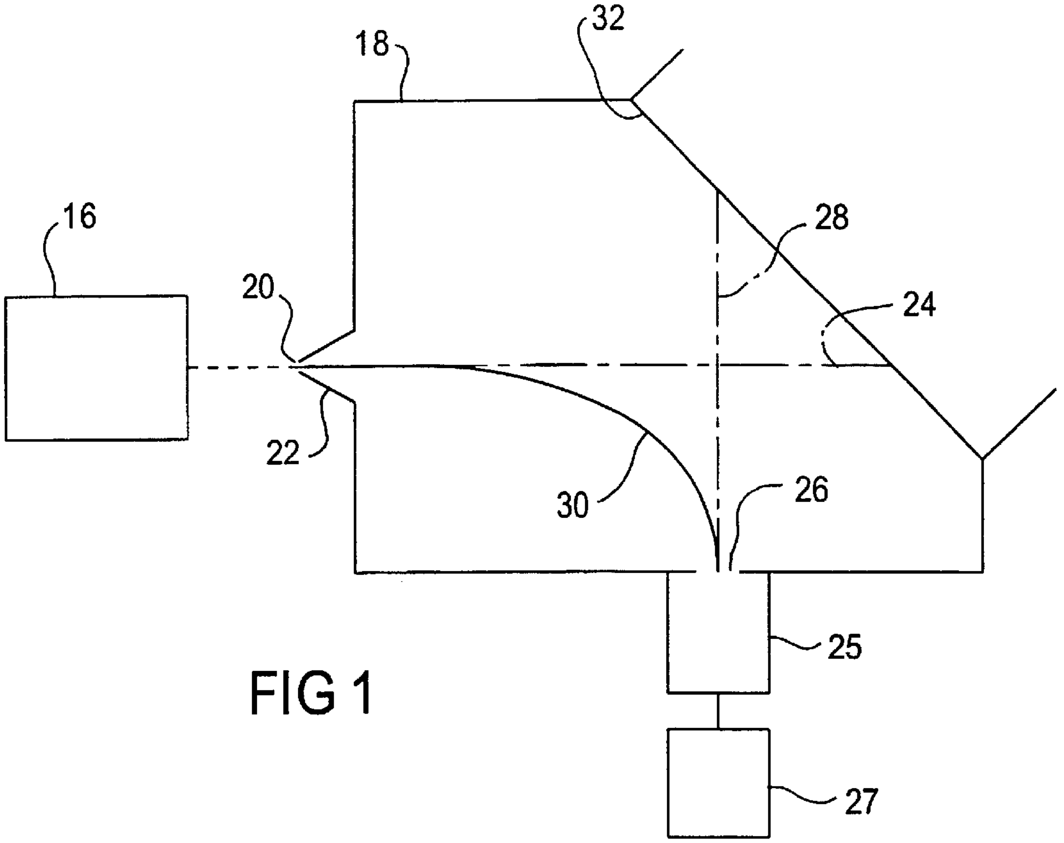
FIG 1
FIG 2
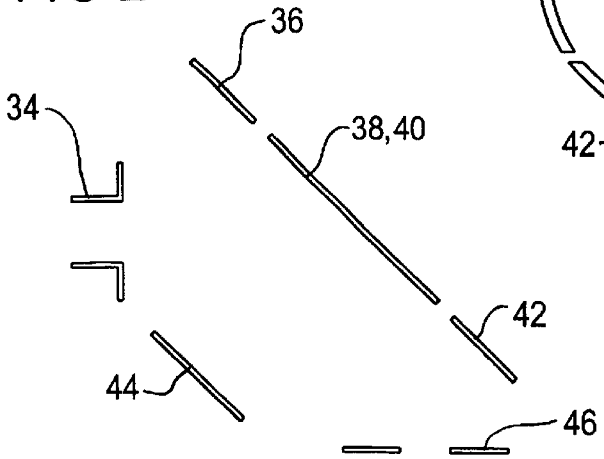
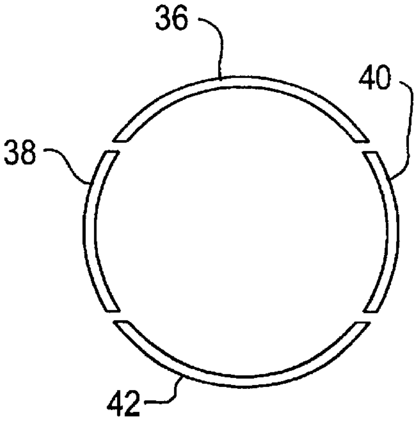
FIG 3

ION OPTICAL SYSTEM FOR A MASS SPECTROMETER

TECHNICAL FIELD

This invention relates to controlling charged particle beams and in particular to an ion optical system in a mass spectrometer. It also relates to an optical system as such for charged particles.

The present invention will be described mainly with reference to an Inductively Coupled Plasma-Mass Spectrometer (ICP-MS) instrument having an Inductively Coupled Plasma ion source and a quadrupole mass analyser, however it is to be understood that it may be applied to other types of mass spectrometers employing other types of ion sources and other types of mass analyser. A charged particle optical system per se, according to the invention, may be used in charged particle beam applications, including particle-emission micro analysis, microscopy and thin film technology.

BACKGROUND

There are a number of applications where it is desirable to know the concentration of particular elements within a material. One way of carrying out such an analysis is to ionise a sample of the material of interest and then determine the relative abundance of particles with the mass to charge ratio representative of the element of interest. Such a determination may be carried out in a mass spectrometer. In an ICP-MS the sample is ionised by injecting it into an inductively coupled plasma and a jet of gas is abstracted from the plasma source and passed into a vacuum chamber. This jet of gas is a beam of particles consisting of a mixture of sample ions and uncharged particles. Before analysis in the mass spectrometer it is necessary to separate the ions from the neutral particles. This is because the neutral particles or gas interferes with the action of the mass analyser and leads to high background. Background may be defined as counts received even when the mass of interest is not present in the sample. Such background together with the instrument sensitivity determines the lower limit of concentration of an element in a sample unambiguously detectable by the system.

It is also necessary to focus the ion beam onto the input of the mass analyser. This is complicated by the fact that the ions do not all have the same energy. There is a variation in ion energy both between ions of different masses and between ions of the same mass.

Control of the ion beam is generally effected via shaped electric fields which in turn are created by suitably positioned electrodes operated at controlled voltages. This set of electrodes is normally referred to as an ion optics system. In existing ICP-MS systems the ions pass through the electric field structure and in the process their path is bent in a predetermined manner. A common approach is to use a series of electrodes arranged with cylindrical symmetry which create curved electric fields. As the ions pass through these fields their path is bent in such a way as to cause the beam to refocus to a desired point. This is exactly similar to the process for focussing light rays and these electrodes are commonly referred to as ion optics lens elements and the system is referred to as a transmissive ion optics system.

A transmissive ion optics system re-focuses the ion beam but it does not separate ions from neutral particles. The conventional way of achieving such separation uses an on-axis metal plate which physically blocks the neutral particles. This is variously called a photon stop, neutral stop or stopping plate. The ion beam is deflected to a donut shape around this stop by the electric fields and then re-focussed after the stop. Systems having such a stop structure have numerous disadvantages. Firstly the efficiency with which the beam is deflected around the neutral stop is usually relatively poor and very dependent on the mass of the ions. Light ions tend to be deflected too far and a large proportion are lost. Heavy ions are not deflected far enough and hit the plate also resulting in their loss. The overall ion collection efficiency is low and mass dependent. Further, for successful deflection and subsequent re-focussing the deflection angles must be kept reasonably small which means the ion optics becomes quite long. This in turn means the ion path through the ion optics is long with the net result that there is considerable loss of ions to collision with neutral particles. This further reduces the ion collection efficiency. Yet a further disadvantage is that such systems exhibit considerable change in image position with initial ion energy (often called chromatic aberration from analogy with light optics). Thus only one mass can be brought to an accurate focus at the mass analyser entrance resulting again in loss of sensitivity for ions of other masses. In theory this can be corrected by changing the electrode voltage depending on the mass of interest. In practice however, such dynamic lens elements exhibit very poor stability due to surface charge build up.

Several on-axis systems are currently offered for sale and differ from each other principally in the position of the neutral stop, the voltage (if any) applied to such a stop and the number and arrangement of the ion optics elements. For example the Sciex "Elan 6000" places a grounded neutral stop in the throat of the skimmer cone (they call it a shadow stop) and use a single lens element of large diameter directly behind this shadow stop. By contrast, the Varian Ultramass uses 6 ion optics lens elements with the neutral stop in the middle of the ion optics elements and applies a voltage to the neutral stop.

In an attempt to overcome some of the problems of on-axis neutral stop systems, some designers use an approach of deflecting the ion beam out of the neutral beam. One example of such an arrangement is the Hewlett Packard omega lens system used in their 4500 ICP-MS. This system uses an arrangement of 6 lens elements followed by a four electrode deflector which cause a lateral shift in the wanted ion beam. The system eliminates the need for an on-axis neutral stop but in practice the system suffers from most of the same problems as the on-axis approach.

SUMMARY OF THE INVENTION

An object of the present invention is to reduce the above discussed limitations by providing an alternative to a transmissive ion optics system.

In addition to creating electric field patterns which deflect ions as they pass therethrough, it is possible to create fields which ions do not penetrate but will instead reflect off. By controlling the shape of the electric field it is possible to direct such reflection so as to create a focussing effect. In effect, an ion mirror instead of an ion lens is provided.

Thus according to the invention there is provided a mass spectrometer which includes a source for providing a beam of particles including ions, a mass analyser and an ion detector for receiving ions from the beam of particles for spectrometric analysis, and an ion optics system for reflecting ions from the beam to the mass analyser and detector.

Preferably the ion optics system comprises multiple electrodes and establishes an electrostatic field which simultaneously reflects and focusses the ion beam. The focussing may be onto the mass analyser entrance.

A particular type of ion mirror called a reflectron has been used in time of flight ICP-MS instruments but only to increase the apparent ion path length in the drift region employed in such instruments. This region is after the separation of ions from neutrals has been effected and such structures are not used as ion focussing devices. To the applicant's knowledge, the significant advantages which may be achieved via use of an ion mirror in the ion/neutral separation stage and ion focussing stage have not been previously recognised.

In an ion mirror, the ions are reflected but the neutral particles, being uncharged, pass straight through the field. According to the invention, the electrodes and their support structures are designed so that they are out of the path of the neutral particles, that is, there are no physical obstructions in the path of the neutral flux and these particles will therefore pass through the entire ion reflective structure without being scattered. This may be achieved, for example, by arranging the electrodes in a ring through which neutral particles pass. Further, a pumping port may be positioned so as to intersect this flux, and the majority of the neutrals can be removed after a minimum one pass through the vacuum chamber and before they have a chance to scatter off the chamber walls. This leads to lower background pressure in the vacuum chamber. The ions can in principle be reflected through any included angle but reflection through a substantial angle of preferably 90° or greater makes it easier to physically accommodate the mass discriminator and suitable pumping port within the available space. In this way separation of ions from neutrals can be achieved very efficiently.

A further advantage of a reflective ion optics system is that the ion path can be made very short. For example, in an embodiment of the invention the ion path from skimmer cone to mass analyser entrance is only 6 cm. By contrast, a typical conventional ion optics system has ion path lengths of about 17 cm and some commercial systems are still longer. Since the chamber is never free of neutral particles (even with a preferred pumping arrangement to be described below), collisions between ions and neutrals will occur and in each such collision the ion involved is lost. The longer the path length the more ions will be lost. Thus, by reducing the path length the number of lost ions is reduced. Alternatively, higher pressures can be tolerated in the chamber, for the same ion loss, which leads to smaller pumps and a cheaper system.

Another advantage of an ion mirror system is that it is easier to create complex spatial field patterns which can correct out aberrations caused by varying ion energies.

It is also possible to electrically steer the beam so that the focus point coincides with the entrance aperture to the mass analyser.

Yet a further advantage of a mirror based ion optics system is that it is possible to create a mirror field which is not infinitely strong such that only ions of interest are reflected off the field in the intended fashion. That is, the field can be adjusted so that ions with energy greater than that which can be handled by the mass analyser are able to penetrate the field and continue on with the neutral beam to the vacuum pump. In this way the mirror can also act as an energy filter removing high energy ions which would otherwise cause undesirable background in the mass analyser. Thus the invention also encompasses a method of operating a mass spectrometer of the invention for filtering higher energy ions from lower energy ions.

The invention encompasses mass spectrometers employing any type of ion source including an inductively coupled plasma (ICP) ion source as described above. Examples of alternative atmospheric pressure ionisation sources are an electrospray ion source or a chemical ionisation source.

For a better understanding of the invention and to show how it may be carried into effect, preferred embodiments thereof will now be described, by way of non-limiting example only, with reference to the accompanying drawings.

BRIEF DESCRIPTION OF THE DRAWINGS

FIG. 1 is a diagrammatic illustration of a preferred arrangement of components in a mass spectrometer according to the invention.

FIG. 2 is a diagrammatic side elevation illustration of a preferred arrangement of electrodes for the spectrometer of FIG. 1.

FIG. 3 is a front elevation of portion of the electrode arrangement of FIG. 2.

Figure 4:
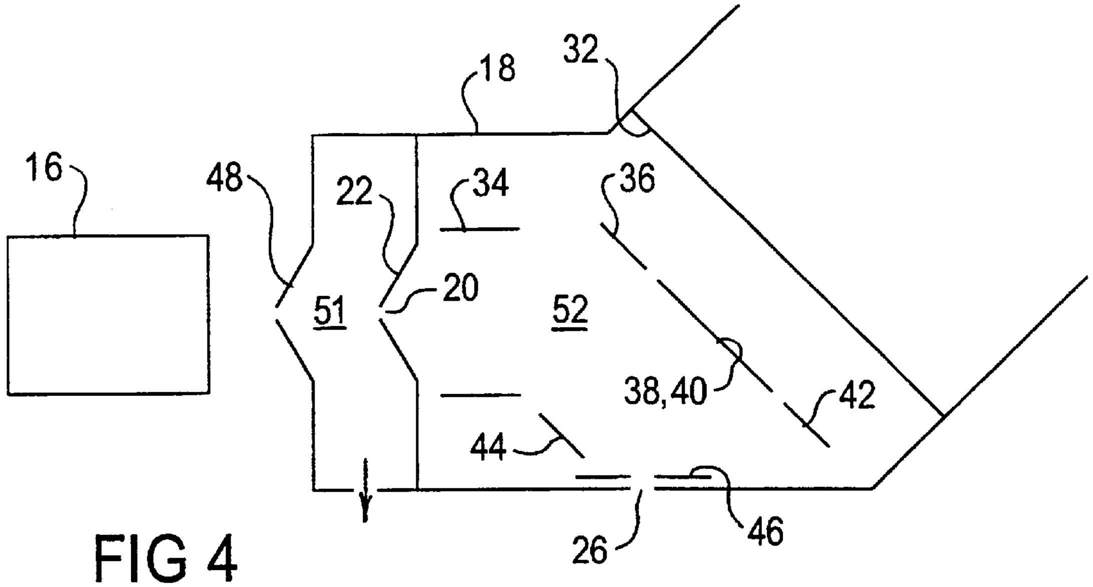
FIG. 4 is a diagrammatic illustration of an arrangement of components in a mass spectrometer according to the invention including an ICP ion source.

In a preferred arrangement of an ICP-MS as illustrated by FIG. 1, a jet of gas, which is abstracted from a plasma source 16 and consists of a beam of mixed particles, namely ions of the sample to be analysed and uncharged particles (neutrals), is passed into a vacuum chamber 18 via an aperture 20 of a skimmer cone 22. The axis of such a beam is indicated by reference 24. A mass analyser 25 having an entrance 26 is arranged such that its axis (indicated by reference 28) is at an angle of substantially 90° to the beam axis 24. A detector is diagrammatically illustrated at 27. An electrode arrangement (not shown in FIG. 1 and to be described with reference to FIGS. 2 and 3) which provides an "ion mirror" is located in the vacuum chamber 18 such that its electrostatic field reflects ions from the path of the particle beam along axis 24 through substantially 90° and into the mass analyser entrance 26, as illustrated by path 30. Neutral particles are not influenced by the ion optics and thus continue along the path 24. A port 32 for a turbomolecular pump is arranged such that it is at approximately 45° to the beam axis 24 and the axis 28 of the mass analyser. This arrangement allows both the neutral beam along axis 24 and the mass analyser axis 28 to be directed at the pumping port 32. Since the pumping port 32 represents a sink for neutrals (equivalent to a black hole for light), the illustrated arrangement further reduces the chance of on-axis neutrals entering the mass analyser 25. The arrangement also allows for the provision of a smaller vacuum chamber 18 than the prior art arrangements.

Preferably a set of seven electrodes 34, 36, 38, 40, 42, 44 and 46 see FIGS. 2 and 3) is used to provide an ion reflecting or ion mirror system for creating an aberration free focus at the mass analyser entrance 26. With reference to FIG. 2, electrode 34 is an extraction lens behind the skimmer cone 22, and electrode 46 is at the entrance 26 to the mass analyser 25. Electrode 44 is located between electrodes 34 and 46 and is at substantially 45° to each. Electrodes 36, 38, 40 and 42 are segments of a hollow ring the plane of which is at substantially 45° to the plane of electrodes 34 and 46 (i.e. it is substantially parallel to electrode 44) and is located between the mass analyser entrance 26 and the pumping port 32. In use, a substantial negative voltage (eg. −200 to −800 V) is applied to electrodes 34 and 44, and electrodes 36, 38, 40 and 42 (the segments of the ring) all have a positive voltage applied to them, which can be controlled for each individual electrode segment. Electrode 46 has a zero to small negative voltage (eg. between 0 to −50 V) applied thereto. The ring electrode constituted by segments 36 to 42 allows neutral particles to pass therethrough, that is, it provides an unobstructed path from the skimmer cone 22 to the pumping port 32 along axis 24.

The ring electrode structure 36 to 42 also offers the advantage that the ion beam along path 30 can be steered from side to side (i.e. into or out of the plane of the drawing) by applying a voltage differential between electrodes 38 and 40. Similarly, by applying a differential voltage between electrodes 36 and 42, the focus point of the ion beam along path 30 can be steered forwards or backwards (i.e. in a direction towards or away from the electrode 44). Thus it is possible to electrically steer the ion beam so that its focus point coincides with the entrance aperture 26 to the mass analyser 25.

The voltages applied to the reflecting ion optical system electrodes 34 to 46 may also be such as to filter higher energy ions from a particle beam. That is, by appropriate selection of the applied voltages, the electrostatic field strength can be adjusted so that ions of interest are reflected off the field but higher energy ions, for example ions with energy greater than that which can be handled by the mass analyser 25, are able to penetrate the field and continue on with the neutral particles to the vacuum pump. For example, a typical quadrupole mass analyser works best for ions between about 0 and 10 eV of energy. Above 10 eV the filtering performance of the quadrupole deteriorates resulting in higher background (caused by ions of the wrong mass/charge ratio passing through to the detector). A reflective ion optics system can be organised to reflect ions with energies below 10 eV but allow ions with energies above 10 eV to pass through.

FIG. 4 illustrates a mass spectrometer similar to FIG. 1 and common reference numerals have been used for some components. Thus FIG. 4 illustrates a mass spectrometer having an ICP ion source 16, vacuum chamber 18, skimmer cone 22 having aperture 20, pumping port 32, mass analyser entrance 26 and "ion mirror" electrodes 34 to 46. The sample flowing through a single aperture of a size which can be conveniently made is normally very much greater than that which can be handled by analysers such as a quadrupole, an ion trap or a time of flight mass analyser. For this reason it is common to use two or more cascaded vacuum chambers with apertures between them so as to drop the pressure and sample flow progressively. Typically the first aperture is provided by a sampling cone 48 (which requires cooling) and the second aperture is that of the skimmer cone 22. Typical pressure for the first vacuum region 51 between the sampling and skimmer cones is 0.5 to 10 Torr and the reflecting ion optics 34 to 46 is preferably located in a second vacuum region 52. Typical pressure range for the second region 52 is from 1-10-2 to 1e-5 Torr. Ion transmission is optimized to the maximum by adjusting the voltages at the electrodes 34, 36, 38, 40, 42, 44, 46 as well as on the sampler 48 and skimmer 22 cones.

Figure 5:
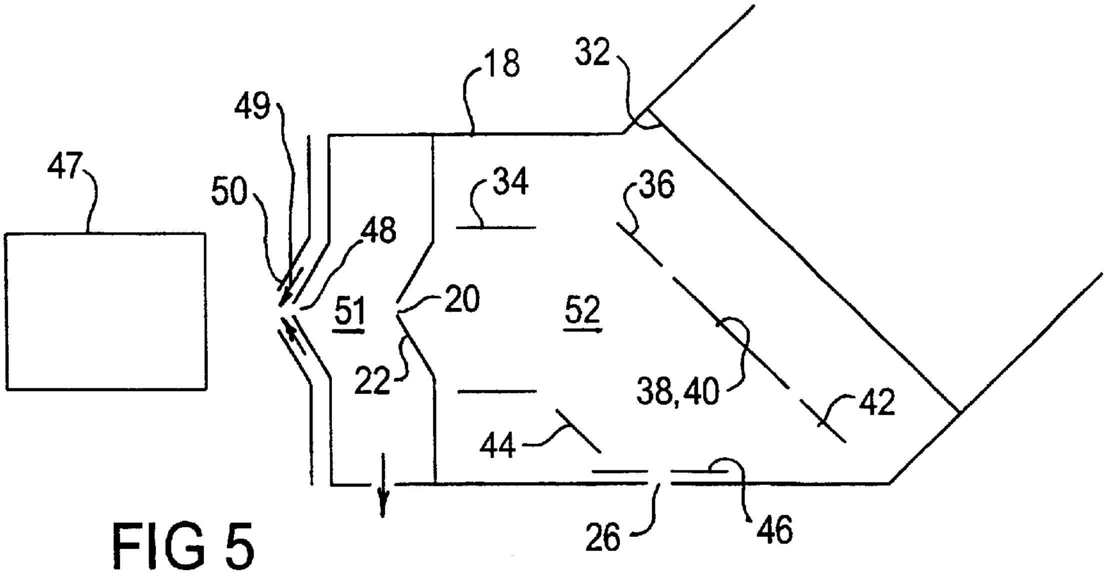
FIG. 5 is a view similar to FIG. 4 but showing a mass spectrometer having an electrospray ion source.

FIG. 5 illustrates a mass spectrometer having an electrospray ion source. As many of the components in this spectrometer are similar to the components illustrated by FIGS. 1 and 4, they are referenced by the same numerals. In FIG. 5 the ionized sample is produced by spraying the liquid through a nebuliser 47 charged to a high positive voltage. The result is that the droplets of sample emerge from the nebulizer 47 at atmospheric pressure carrying a high positive charge. These droplets then subsequently and spontaneously break up further to create ions of the analyte. The ion cloud emerging from the nebuliser 47 is passed into a vacuum region 51 via the aperture in a sampling cone 48 in a similar way to the sampling technique used for an ICP source. There are however some differences, for example, with an ICP source the sampling orifice requires cooling while for an electrospray source it is typically heated and a sheath gas 49 emerging from a protective cover 50 may be used to protect the sampling aperture 48 from the large droplets of analyte. Also ions can be sampled to a vacuum chamber with a capillary (not shown) rather than through a short nozzle. The exact sampling techniques are well known to those skilled in the art.

For a negative ion mode, voltages on the electrospray nebuliser 47 and ion optic electrodes 34–46 should be reversed. Additionally, dynamic scanning voltages can be used on the ion optical electrodes 34, 36, 38, 40, 42, 44, 46, skimmer 22, and sampler 48 to provide the ion energy correction for ions with different masses.

One difference between the ICP ion source 16 and an electrospray ion source 47 is that for an electrospray source it is typical to apply a potential difference between the sampler 48 and skimmer 22 cones to achieve a better efficiency of ion beam extraction. One undesirable effect of applying such a potential difference is to increase the energy spread of the ions emerging from the second or skimmer cone 22 aperture. As described above, for a conventional ion optics system, ions of different energies focus at different points (an effect roughly equivalent to chromatic aberrations in a light optics focussing lens system). Thus this initial greater spread in ion energies results in poorer focus. The present invention reduces the change in focus with changing initial ion energies and can therefore maintain a tight focus using an electron spray ion source. As the result of this sensitivity is improved. Also the present invention results in excellent ion extraction from the neutral jet coming from an electrospray ion source due to the properties of the reflecting ion optics.

The invention allows for substantially higher ion collection efficiencies to be realised than in the prior art without attendant increase in background. Ion collection efficiency is a critical component of instrument sensitivity. Instrument sensitivity is usually defined as counts per second detected when a solution of a specified concentration is aspirated, the units are typically MHz/PPM. If we compare some commercial products based on a quadrupole mass filter, the Varian Ultramass achieves 20 MHz/PPM for midmass ions (Indium), HP reports sensitivities of approximately 50 MHz/PPM (Indium) for their HP4500 ICP-MS. PE(Sciex) report 60 MHz/PPM again for Indium. Quadrupole mass filters are commonly used in ICP-MS instrumentation. They are well understood and documented.

To put these numbers in perspective, it is possible to calculate an approximate theoretical efficiency achievable using a quadrupole mass filter and electron multipler detector as follows:

A 1 PPM solution of Indium (atomic mass 115) contains 1m9 Indium/litre=5.24E18 atoms per litre. A nebuliser uptake of 1 ml/min is equivalent to 8.73E13 atoms/second. Typical nebuliser efficiency is about 2% yielding 1.75E12 atoms/second into the plasma. The plasma is 99% efficient in ionising these atoms yielding 1.73E12 ions/second. Virtually all of these are collected through the sampler cone. About 0.7% also pass through the skimmer cone yielding 1.2E10 ions/second into the ion optics. A quadrupole mass analyser and electron multiplier detector has a typical efficiency of about 50% yielding a theoretical maximum count rate of 6E9 ions per second or 6000 MHz/PPM for Indium. Since elemental concentration in a sample is calculated on a weight basis, the ions per second are inversely proportional to atomic weight of the element of interest. Thus for example, a 1 PPM solution of Thorium calculated in the same way (atomic mass 232) would have a theoretical count rate of 6000 *115/232 or 2970 MHz/PPM. As can be seen, the ion optic efficiency of the above mentioned commercial products is only of the order of 0.5% to 1%.

By contrast, an ion mirror based system constructed according to the above described embodiment of the invention has been run with a quadrupole mass filter and electron multipler. With electrode voltages tuned for maximum signal, the system has achieved a sensitivity of 1.560 MHz for a 1 PPB solution of Indium and 2.01 MHz for a 1 PPB Thorium solution. This corresponds to 1560 MHz/PPM for Indium (26% efficiency) and 2010 MHz/PPM for Thorium (68% efficiency). Tuning for maximum signal to background ratio yielded a sensitivity above 500 MHz/PPM for both elements. This data was collected with the detector aligned on the quadrupole axis and corresponds to ion optic efficiencies of 8.3% and 16.8% respectively. Stability was measured to be comparable with conventional systems at a few percent over 8 hours. These are very early results and further improvements are envisaged. For example, it is known that moving the detector away from the quadrupole axis (called an off axis detector) yields substantial reduction in background without affecting sensitivity. None the less, even these early results are substantially better than that achievable with conventional systems.

The invention is not limited to any specific means, either structural or electrical, for achieving the desired field distribution. All that is necessary is that the ion mirror structure and the voltages applied to its electrodes establish an electrostatic field in which the field strength varies axially and radially to establish a reflecting field shape. The energy density distribution of such a field could be defined by for eg. a high order multidimensional polynomial equation, or a three-dimensional parabolic or a spherical function. Thus, in addition to varying the voltages applied to the electrodes of an ion mirror, it is within the scope of the invention to vary the number of electrodes, their shape, their spacing, their material composition, the diameter to length (ie. depth) ratio of the mirror, and the use of "external" electrostatic fields produced by other elements of an ion optical system. It is also within the scope of the invention to provide circumferentially segmented electrodes such that varying voltages can be applied to the segments to provide an electrostatic field of desired shape. Mechanical adjustment of the relative positioning of individual electrodes is also comprehended. Thus the invention encompasses any practical way of producing a desired non-linear reflecting field.

It will be evident from the above description that the invention offers several advantages over conventional "on-axis" arrangements of the ion optical system in mass spectrometers. Additional advantages include reduced manufacturing costs and sizes of instruments, and simpler operation as optimisation of the focus of the ion optical system is not as critical as in prior instruments, that is, the invention offers better "depth of field" control at the mass analyser.

It is to be understood that the invention is also intended to encompass the provision of an "optical" system as such for charged particles for use in suitable applications other than mass spectrometry. Thus, according to the invention, there is also provided an optical system for controlling charged particles in a beam of charged particles wherein the system includes a plurality of electrodes for establishing a reflecting electrostatic field which is non-linear axially and radially. Thus the invention includes provision of an optical system for controllably reflecting charged particles. Preferably the plurality of electrodes permits transmission of selected charged particles therethrough. Other elements and features of a reflective optical system per se may be as described above. It will also be evident from the preceding description how such a system may be operated.

The charged particle optical system may be used in various charged particle beam applications. For example, the physical, chemical, optical properties of sample electron/ion surface images such as shape, composition, distribution of density, mobility, work function etc. are investigated by means of surface electron/ion emission microanalysis, mass-spectrometry microscopy. During experiments for such investigations it is important to tune the charged particle beam system to one particular type of particle and eliminate others. This gives appropriate signal to noise ratio, that is, eliminating the high energy components from a charged particle beam increases the signal to noise ratio. Attenuation of the beam on its way to a particle analyser provides for a wide dynamic range of measurements, less analyser pollution and longer lifetime of the analyser between servicing. Currently used transmissive ion lens systems, which deflect an electron/ion beam sideways, are limited by considerable spherical and chromatic aberrations. As a result of using deflection plates the chromatic aberrations are increased, introducing an additional astigmatic distortion. Also transmissive beam deflection systems (in contrast to the present reflecting system) cannot completely eliminate unwanted particles including neutrals, metastable neutrals, photons and electron/ion high energy component. The present optical system is less complicated and less expensive than the known transmission beam deflecting system because an improved signal to noise ratio is not dependent on complicated and expensive "downstream" (i.e. post detector) means.

The invention described herein is susceptible to variations, modifications and/or additions other than those specifically described and it is to be understood that the invention includes all such variations, modifications and/or additions which fall within the scope of the following claims.

What is claimed is:

1. A mass spectrometer including a source for providing a beam of particles including ions along a first axis, a mass analyser and an ion detector for receiving ions from the beam of particles for spectrometric analysis, said mass analyzer and ion detector aligned along a second axis distinct from said first axis and an ion optics system for establishing an electrostatic dipole field in which the dipole field strength varies axially and radially in respect to both said axes for reflecting ions from the first axis to the second axis.

2. A mass spectrometer as claimed in claim 1 wherein the ion optics system comprises multiple electrodes for establishing said electrostatic dipole field for simultaneously reflecting and focussing the ions to produce a focussed ion beam.

3. A mass spectrometer as claimed in claim 2 wherein the electrodes are arranged for the ion beam to be focussed at the mass analyser entrance.

4. A mass spectrometer as claimed in claim 2 wherein the multiple electrodes are arranged to allow neutral particles in the particle beam to pass through the ion optics system.

5. A mass spectrometer as claimed in claim 4 wherein the multiple electrodes include a plurality of electrodes arranged in a ring through which, in use, neutral particles pass.

6. A mass spectrometer as claimed in claim 5 wherein the plurality of electrodes in a ring are arranged such that the focussed ion beam is steerable by applying different voltages to different electrodes in the ring.

7. A mass spectrometer as claimed in claim 6 wherein the plurality of electrodes in a ring comprises four electrodes, each one of which extends over an arc of about equal length.

8. A mass spectrometer as claimed in claim 6 wherein the plurality of electrodes in a ring comprises four electrodes, wherein two of the electrodes are oppositely located and each extends over an equal arc of greater than 90°, the other two oppositely located electrodes each extending over an equal arc of less than 90°.

9. A mass spectrometer as claimed in claim 1 wherein the ion optics system is arranged to establish said electrostatic dipole field for reflecting the ions through an angle of at least 90°.

10. A mass spectrometer as claimed in claim 1 including a vacuum chamber, the ion optics system being located in the vacuum chamber, a skimmer cone included in a wall of the vacuum chamber through which the beam of particles from the source enters the vacuum chamber along said first axis, the mass analyser having an entrance aperture on said second axis for the mass analyser to receive ions that are reflected by the ion optics system from the first axis to the second axis.

11. A mass spectrometer as claimed in claim 10 wherein a wall of the vacuum chamber includes a port for a turbomolecular pump, the port being orientated at an angle to said axes and sized such that both axes intersect said port.

12. A mass spectrometer as claimed in claim 1 wherein the axis is orthogonal to the first axis for the mass analyser to receive ions that are reflected through an angle of substantially 90°, and the port is orientated at an angle of approximately 45° to said axes.

13. A mass spectrometer as claimed in claim 10, 11 or 12 wherein the ion optics system comprises a number of electrodes, a first one of which acts as an extraction lens behind the skimmer cone, a second one of which surrounds the mass analyser entrance, a third one of which is located between said first and second electrodes at an angle of substantially 45° to each, and is offset from said axes in said first and second directions, and a remaining plurality of electrodes arranged in a ring lying in a plane substantially parallel to the third electrode and centered on the first axis for neutral particles to pass unobstructed to the port for the turbomolecular pump.

14. A mass spectrometer as claimed in claim 1 wherein the mass analyser is a quadrupole mass analyser.

15. A method of operating the mass spectrometer of claim 1, the method including applying voltages to the ion optics system to establish said electrostatic dipole field having a strength which reflects ions up to a predetermined energy and allows ions of higher energy to pass through the field.

* * * * *